United States Patent [19]
Choi

[11] Patent Number: 5,184,264
[45] Date of Patent: Feb. 2, 1993

[54] ADJUSTABLY MOUNTED AUDIO CONTROL HEAD

[75] Inventor: Bo H. Choi, Kyungki, Rep. of Korea

[73] Assignee: Goldstar Co., Ltd., Seoul, Rep. of Korea

[21] Appl. No.: 794,804

[22] Filed: Nov. 12, 1991

Related U.S. Application Data

[63] Continuation of Ser. No. 413,217, Sep. 27, 1989, abandoned.

[30] Foreign Application Priority Data

Sep. 30, 1988 [KR] Rep. of Korea .................. 12863

[51] Int. Cl.$^5$ ............................................. G11B 5/54
[52] U.S. Cl. .................................. 360/105; 360/85; 360/96.1
[58] Field of Search ............... 360/109, 105, 83, 84, 360/85, 93, 95, 96.1

[56] References Cited

U.S. PATENT DOCUMENTS

| 4,499,513 | 2/1985 | Umeda | 360/85 X |
| 4,589,040 | 5/1986 | Kawase | 360/109 |
| 4,669,012 | 5/1987 | Tomita | 360/105 |
| 4,757,398 | 7/1988 | Nishida et al. | 360/85 |

Primary Examiner—Andrew L. Sniezek

[57] ABSTRACT

A high speed searching device utilizing a turning A/C (audio control) head capable of carrying out the high speed searching function without giving overstrain to tape by turning and contacting A/C (audio control) head itself to tape during high speed running in a state that the tape being not drawn out from tape cassette. The invention is constituted such that the A/C (audio control) head of head lever turned in accordance with the right or left movement of connecting plate is made possible to be selectively contacted to the one side of tape of unloaded state. According to the invention, the structure of whole device is simplified and the trailing path of tape is minimized so that damage and reduction of searching of tape according to the high speed searching can be prevented at the same time damaging factor of head drum can be excluded.

3 Claims, 5 Drawing Sheets

ADJUSTABLY MOUNTED AUDIO CONTROL HEAD

This application is a continuation of application Ser. No. 07/413,217 filed on Sep. 27, 1989 now abandoned.

BACKGROUND OF THE INVENTION

The present invention relates to a high speed searching device utilizing an A/C head (Audio and Control head) of a video cassette tape recorder (hereinafter, referred to as VCR), and more particularly to a high speed searching device utilizing the rotary A/C head which renders to turn the A/C head itself in a state where the tape is not drawn out from tape cassette and contacting the tape during high speed running so that high speed searching function can be carried out without giving any over-strain to the tape.

In a conventional VCR that has been generally used various kinds of high speed searching devices have been known which searches a particular signal recorded on the tape while running the tape with high speed and verifying the location of desired picture and then being used to play back at play back mode. In most of these conventional devices, such system which utilizes mainly tape guide means and renders the tape to be half loading to the A/C head and then carries out the high speed searching function by the high speed running of tape, is widely used.

That is, exemplifying one of such high speed searching device of a conventional VCR which is well known, as shown in FIG. 5, an A/C head 2 is provided fixedly at one side of a head drum 1, in front of the head drum 1, there are respectively provided a cam gear 3 formed with a cam groove 3a and a connecting plate 4 which has cam pin 4a to be inserted in the cam groove 3a of said cam gear 3 and being moved to right and left in response to the normal or reverse rotation of the cam gear 3, one end of an interlocking lever 5 is, inserted in an operating pin 4b mounted at the other side of the connecting plate 4, i.e., at an opposite side of the position of the cam pin 4a, and one end of a turning lever 6 provided with guide post 6a is contacted to another end of the interlocking lever 5.

Therefore, according to the conventional high speed searching device constructed as above, the operation is such that when a driving motor (not shown) is driven and the cam gear 3 is turned clockwise, the cam pin 4a of connecting plate 4 is moved in a rightward direction. Thus, since the connecting plate 4 and operating pin 4b are moved in the same direction, the interlocking lever 5 connected to the operating pin 4b and the turning lever 6 interlocked in the this are turned to arrow direction as much as a predetermined angle and draws out the tape from the middle pocket C1 of tape cassette C by guide post 6a mounted at its front end, in a state of half loading so as the drawn tape T is being contacted to the A/C head 2, the tape T is rendered to high speed running (FF/REW) so that the desired high speed searching function is carried out.

However, in the conventional device of this system, since two levers 5 and 6 for drawing and contacting the tape T to the A/C head 2 fixed to base plate are required, the structure of the whole device becomes complicated, and the tape T is half loaded by the guide post 6a of the turning lever 6, accordingly such a case that the tape T being inserted between the guide post 6a and A/C head 2 owing to either the perpendicularity of the guide post 6a or tilt or azimuth angle of A/C head 2 has often arisen and becoming to cause the damage of tape T, since the ratio between the interlocking lever 5 and turning lever 6 is too much, it is difficult to set correctly the position of the guide post 6a. Furthermore, the running path of tape at the time of high speed searching is carried out by supply reel 7-guide 9a-guide post 6a-tape guide 9c-guide 9b-take-up reel 8, and in this half loading state, the frictional portion contacted with tape T is relatively increased, whereas since the tape T runs with high speed, becoming to cause the damage of tape T and reduction of searching speed, and since the running tape T is constantly wrapping to one side of circumference of head drum 1, there has been the disadvantage and problem that the damaging factor of head drum 1 by the surface friction can not be excluded.

SUMMARY OF THE INVENTION

Therefore, it is an object of the present invention to provide a high speed searching device utilizing a rotary A/C head which turns the A/C head according to the movement of the connecting plate without drawing out the tape by utilizing a separate guide post lever or the like and carrying out the high speed searching function at a state that the A/C head being directly contacted to the tape of high speed running (FF/REW), so that the structure of the whole device is simplified and the worry that running tape being inserted to A/C head or the like is excluded, and the frictional contact portion of tape is decreased at the time of high speed searching and thereby either the damage of tape by friction or reduction of searching speed can be prevented and since the tape is not contacted with head drum, the damage of head drum can be prevented.

The foregoing and other objects as well as advantages of the present invention will become clear by following description of the invention with reference to the accompanying drawings.

DETAILED DESCRIPTION OF THE INVENTION

Figure 1:
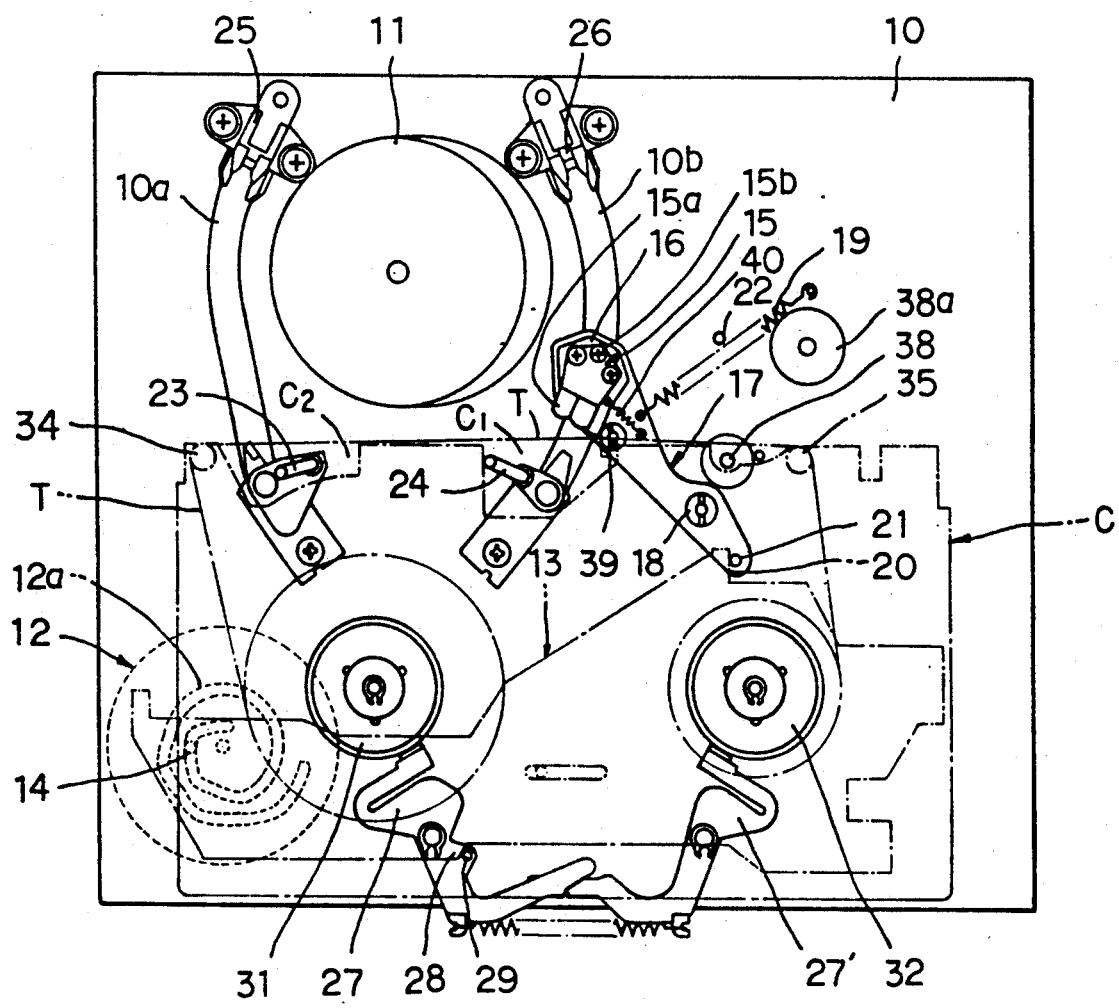
FIG. 1 is a schematic plane view illustrating a stopping state of VCR deck mechanism to which the device of the present invention is applied.
Figure 2:
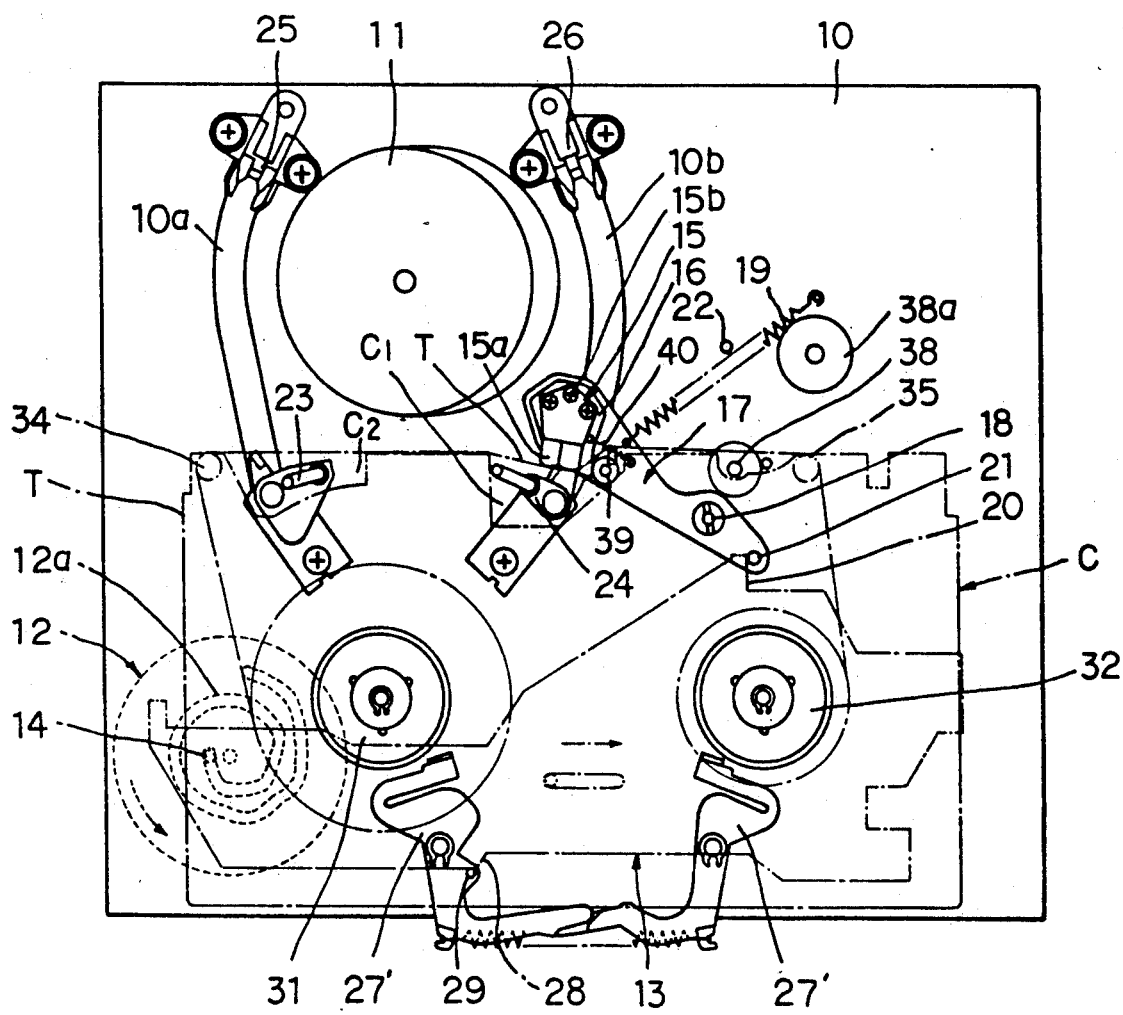
FIG. 2 is a schematic plane view illustrating a high speed searching state of VCR deck mechanism of FIG. 1.
Figure 3:
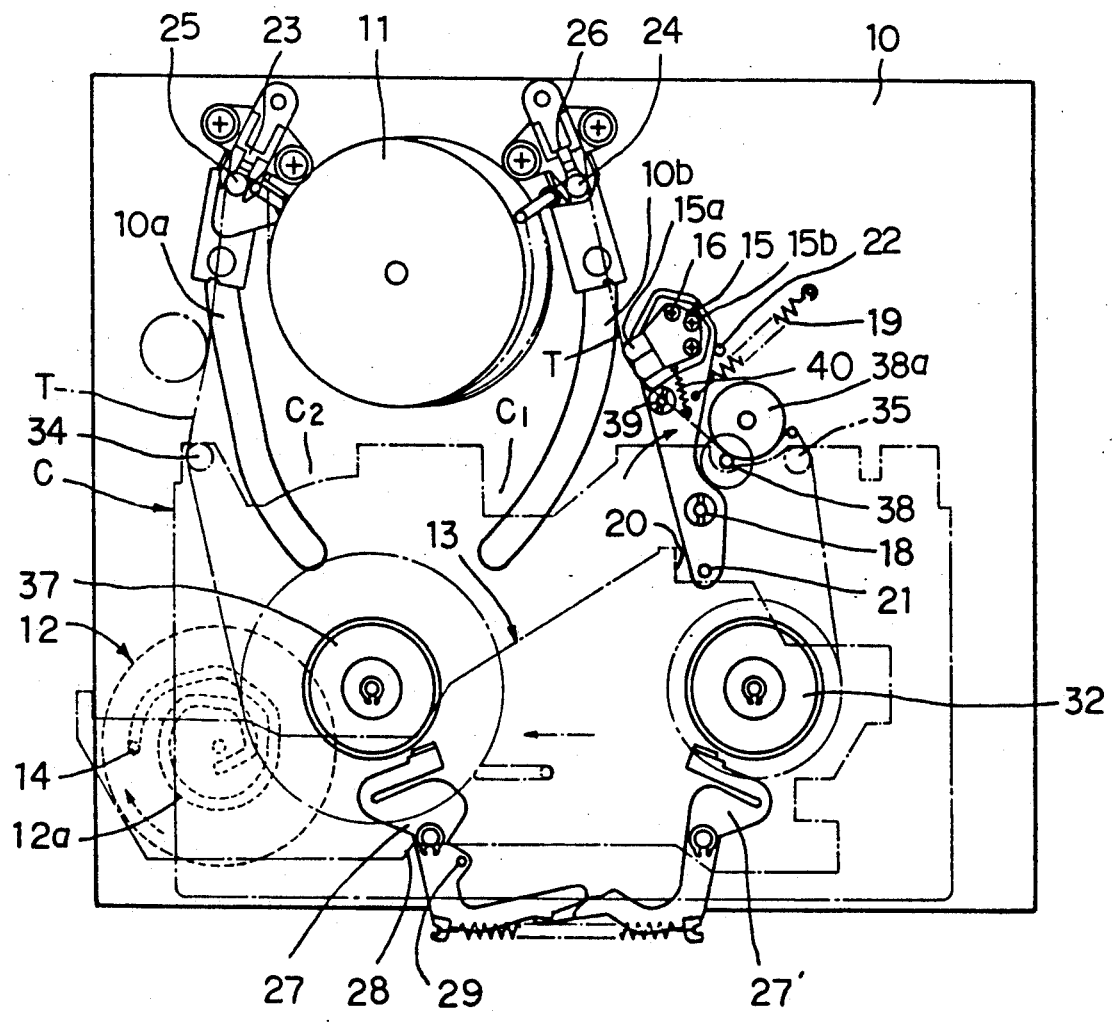
FIG. 3 is a schematic plane view illustrating a play back operation state of VCR deck mechanism of FIG. 1.

FIGS. 1 to 3 are schematic plane views of VCR for showing the construction and operation of high speed searching device according to the present invention. As shown the drawings, in a head drum 11 is mounted at the rear middle portion of a base plate 10, and supply reel 31 and take-up reel 32 on which tape cassette C is laid are mounted at the frontside thereof, a cam gear 12 having cam groove 12a and a connecting plate 13 having a cam pin 14 to be inserted in the cam groove 12a of said cam gear 12 are positioned at one side of flat body and moving to right and left according to the rotation of said cam gear 12 are respectively mounted below the supply reel 31. A/C head assembly 15 is provided at one side of the head drum 11. The high speed searching device according to the present invention is constituted such that A/C head lever 17 on which said A/C head 15 is fixed at one end of its upper surface is pivotally supported on the base plate 10 by a height adjusting screw 18 being usable as a hinge at the same time this is mounted resiliently by a spring 19 for returning to play back position so that the head lever 17 can turn around the height adjusting screw 18 as much as a predetermined angle, and an interlocking pin 21 to be contacted with interlocking ridge portion 20 formed at one side periphery of the connecting plate 13 is mounted to the other end of the head lever 17, i.e., to the opposite end of the mounted place of the A/C head 15, so that A/C head 15a of the head lever 17 can be selectively contacted to the tape T located at middle pocket C1 of tape cassette C in response to the right and leftward movement of the connecting plate 13 by the normal or reverse rotation of said cam gear 12. It is noted that the middle pocket C1 is an opening in the cassette which is positioned below the tape T, when the tape T is in the position shown in FIG. 1, for example.

The A/C head assembly 15 mounted at the head lever 17 is provided with cone screw 39 for the tracking adjustment of A/C head 15a at one side of the head base 16 and a tensile spring 40 for rendering to contact positively of the head base 16 to the cone screw 39, and a head lever 17 to be returned to play back position and a stopper 22 for holding the play back state for setting the return position of head assembly 15 are mounted at one side of the base plate 10 corresponding to the turning section of said head lever 17.

Figure 4:
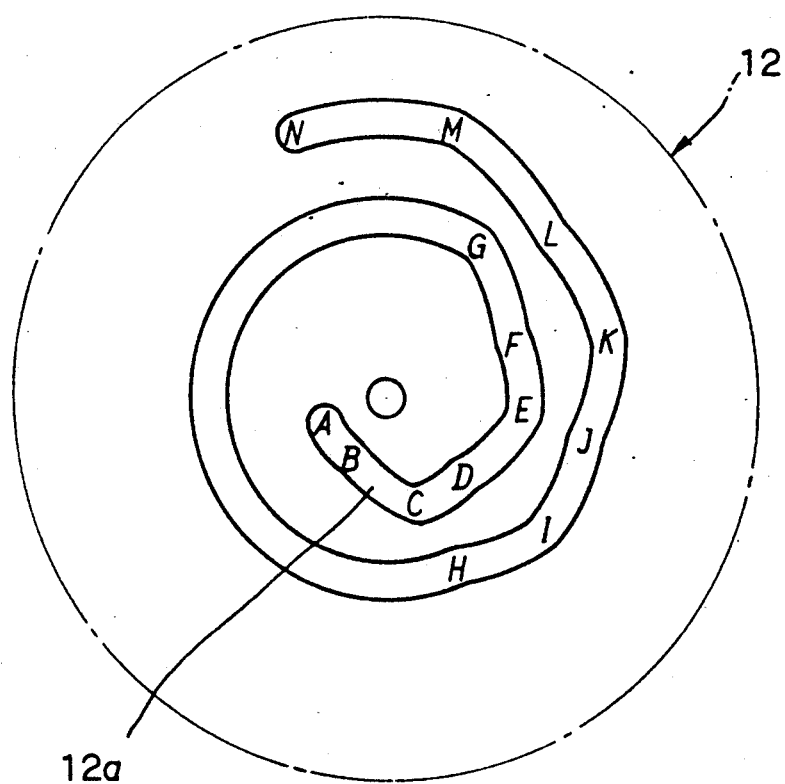
FIG. 4 is a schematic plane view illustrating cam curve of cam gear utilized in the device of the present invention.
Figure 5:
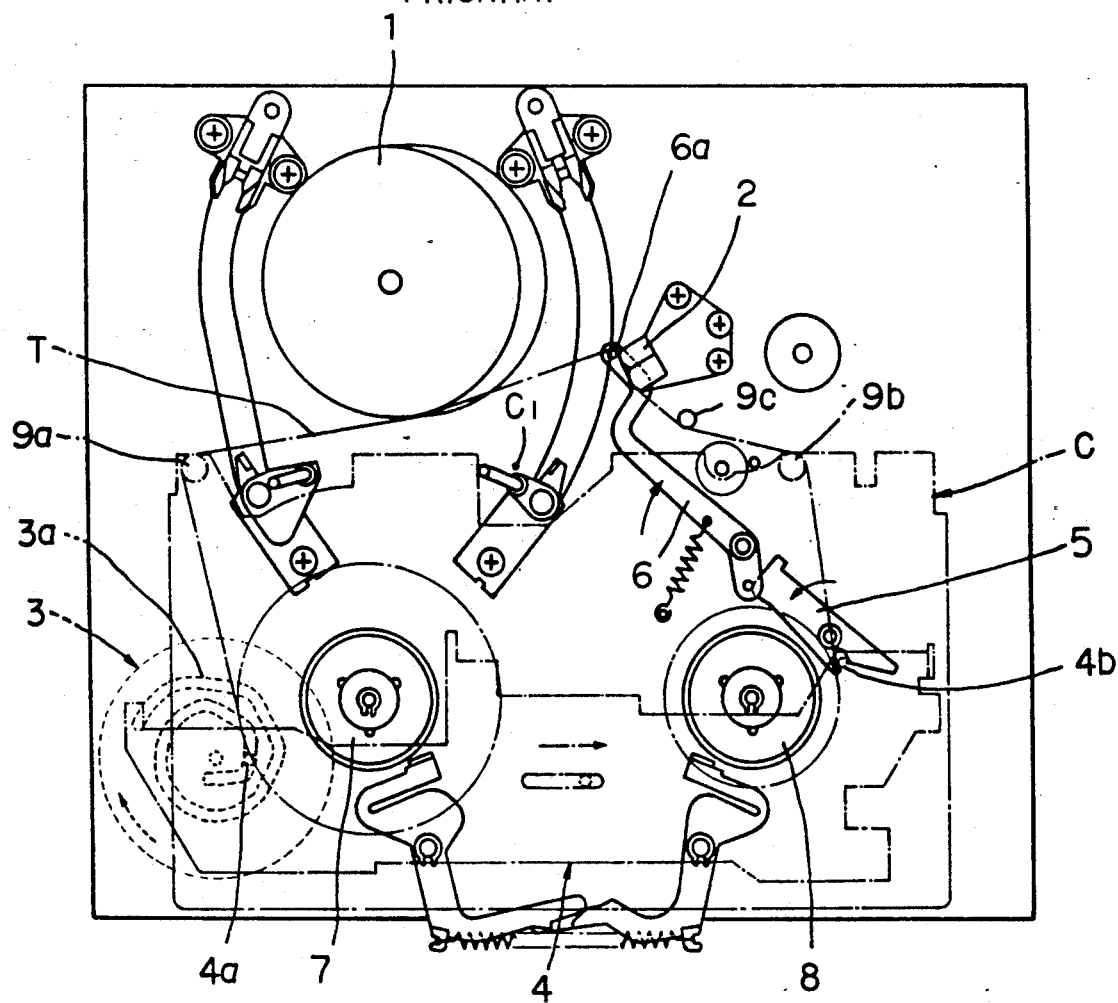
FIG. 5 is a schematic plane view illustrating a high speed searching state of VCR deck mechanism provided with a conventional high speed searching device utilizing A/C head.

The cam groove 12a of said cam gear 12 is composed of, as shown in FIG. 4, from the center, high speed searching section (A-B), stopping and ejecting section (C-D), FF/REW section (E-F), loading section (G-H), pausing section (I-J) REV section (K-L), and playing back, recording and CUE section (M-N).

Loading post assemblies 23 and 24 for drawing the tape and V-stoppers 25 and 26 are respectively mounted at loading pathes 10a and 10b formed at both sides of the head drum 11, a pair of main brakes 27 and 27' are mounted to be interlocked each other at frontward of the connecting plate 13, an interlocking pin 29 to be contacted to an interlocking ridge portion 28 for the brake formed at the front end portion of the connecting plate 13 is mounted at their one side (left side) main brake 27.

In the drawings, reference numerals 34 and 35 are tape guides of the tape cassette C for guiding the tape T wound between the supply reel 31 and take-up reel 32 and are exposed through the left and middle pockets C2 and C1 of the front of tape cassette C, and 38 is a capstan, 38a is a pintch roller, and 15b represents a height adjusting screw of A/C head assembly 15.

The operating condition and effect of the device of the present invention constituted as aforementioned will be described in detail as follows.

FIG. 1 shows the operation of the device of the present invention at stop mode of VCR. In this condition, the cam pin 14 of the connecting plate 13 is located within the stopping and ejecting section (C-D) of the cam gear 12, the interlocking pin 21 of the one end of head lever 17 provided with the A/C head assembly 15 is contacted at the intermediate portion of the interlocking ridge portion 20 for the turning lever formed at the connecting plate 13, accordingly it is in a state that the A/C head 15a is approached with keeping predetermined distance to the tape T located at the middle pocket C1 side of tape cassette C.

Therefore, when the function mode of the VCR is shifted to the high speed searching mode in order to carry out the high speed searching function at the state as these, as shown in said FIG. 2, since the cam gear 12 is turned counterclockwise and the cam pin 14 of the connecting plate 13 is located within the high speed searching section (A-B) of cam gear 12, the connecting plate 13 is moved to the right side and the interlocking pin 21 contacted to the interlocking ridge portion 20 is pushed to the same direction by the interlocking ridge portion 20. Thus, the A/C head lever 17 is turned counterclockwise around the height adjusting screw 18 and the head 15a of A/C head assembly 15 provided at its one end portion is contacted to the tape T located at the middle pocket C1 of said tape cassette C, and at this moment, the main brakes 27 and 27' contacted to said supply reel 31 and take-up reel 32, whose interlocking pin 29 of their one side main brake 27 is pushed to downward by another interlocking ridge portion 28 of said connecting plate 13 and thereby it is in a state that the braking for the supply reel 31 and take-up reel 32 being released, since the tape T becomes the high speed running in this state, desired high speed searching function is carried out by the contact between the control signal sensing means of A/C head 15a and the control signal recorded portion on the tape T.

In the high speed searching mode as aforementioned, as will be appreciated in FIG. 2, since the head 15a of A/C head assembly 15 merely contacts the tape T located at said middle pocket C1 to the tape T unloaded in a state of urging a little to the interior of said middle pocket C1, there is no worry that the running tape T being inserted to the head 15a or the like as conventional device: and since the head lever 17 for contacting the A/C head 15a to tape T is formed with a single body, the structure is simplified and the contacting position between the head 15a and tape T becomes possible to set correctly.

Further, in case of high speed searching according to the device of the present invention, since the running path of tape T is composed of supply reel 31-tape guide 34-tape guide 35-take-up reel 32, the frictional place of the tape T is nothing but the extent of two tape guides 34 and 35, and therefore, inspite of carrying out the high speed searching function while trailing the tape T with high speed as in the time of FF/REW, the problem as either the damage of tape T or worry for reduction of searching speed and the like can be completely excluded, and because the high speed searching as this is carried out in the state of unloading of tape T, the damaging factor of the head drum 11 as that of occurring in the time of high speed searching of half loading heretofore can be completely solved.

On the other hand, when the function mode of VCR is shifted to the play back mode in the state as above description, as shown in FIG. 3, the cam gear 12 is turned clockwise and the cam pin of the connecting plate 13 becomes located within the play back section (M-N) of cam groove 12a. In this state the connecting plate 13 is completely moved to the left side, the contacting condition between the interlocking ridge portion 20 and the interlocking pin 21 for the lever turning is released and the head lever 17 becomes turned counterclockwise by the returning resilient force of the spring 19 for returning to original position, thus turned head lever 17 is stopped at the predetermined location by the stopper 22 for keeping the play back state, and thereby the head 15a of A/C head assembly 15 mounted to the head lever 17 becomes returned exactly to the required play back position.

The present invention as described above is constituted such that, in carrying out the high speed searching function by utilizing the A/C head of VCR, without drawing out the tape from the tape cassette by utilizing separate guide post lever or the like, the A/C head itself is directly contacted to the un-drawn tape by utilizing the head lever interlocked according to the movement of connecting plate so that the required high speed searching function can be carried out, and therefore, there is the effect that the structure of whole device is simplified and the trailing path of tape is minimized so that the damage and reduction of searching speed according to the high speed searching are prevented at the same time the damaging factor of head drum can be excluded.

What is claimed is:

1. A high speed searching device in a video cassette tape recorder including tape loading assemblies for drawing a magnetic tape out of a cassette and around a rotatable head drum into a magnetic tape playback location comprising a base plate;

a connecting plate movably mounted on said base plate, means for moving said connecting plate, a head lever rotatably mounted on said base plate and supporting an audio and control head assembly at one end thereof, means for positioning said audio and control head assembly selectively in a high speed searching position or in a play back portion, said means for positioning said audio and control head assembly in a high speed searching position including means for swinging said audio and control head assembly toward a middle pocket of a tape cassette by the rotation of said head lever in response to movement of said connecting plate, so that in the high speed searching position the audio and control head assembly acts on the tape within the body of the cassette and without the tape being withdrawn from the cassette, and said means for swinging said audio and control head assembly including an interlocking pin carried by said head lever and engaging an interlocking ridge portion of said connecting plate.

2. A device as recited in claim 1 wherein said head lever is biased by resilient means for returning said audio and control head assembly to said play back position.

3. A device as recited in claim 1 wherein a cam gear having a cam groove is rotatably mounted on said base plate, and a cam pin is carried by said connecting plate and is engaged in said cam groove.

* * * * *